May 22, 1951
H. W. PRICE
2,554,313
TRANSMISSION OPERATING MECHANISM
Filed Jan. 13, 1943
6 Sheets-Sheet 1
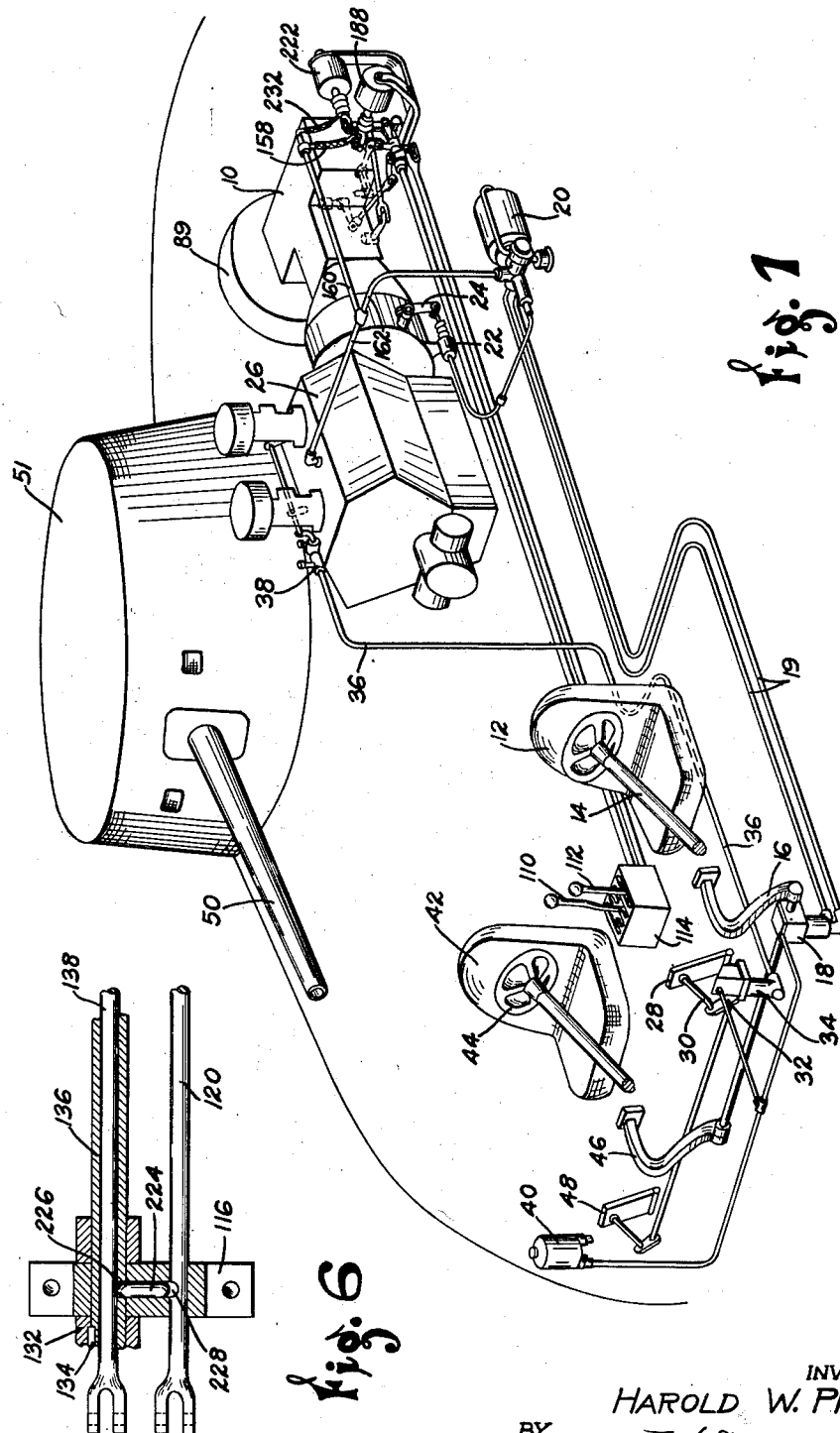
INVENTOR.
HAROLD W. PRICE
BY H. O. Clayton

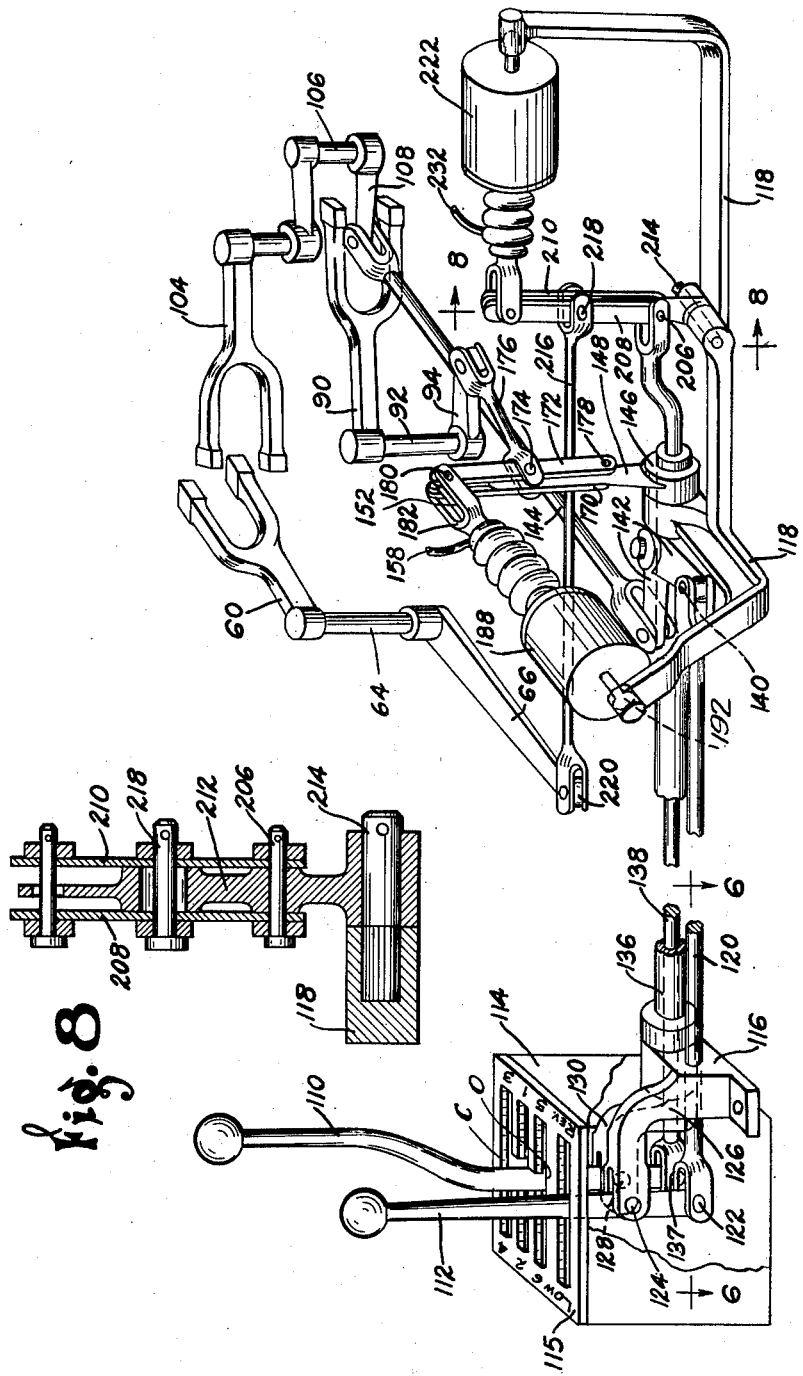

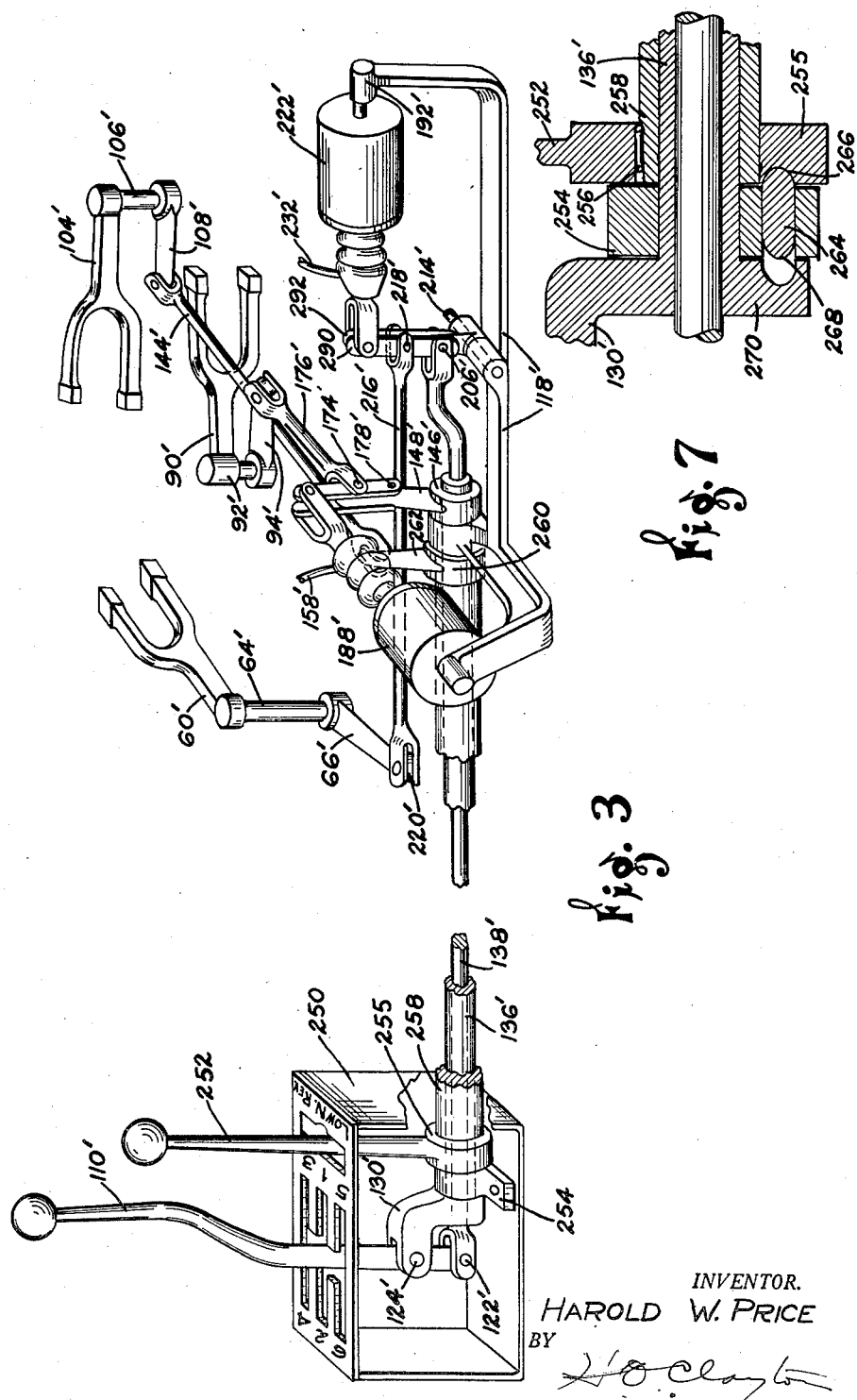

May 22, 1951  H. W. PRICE  2,554,313
TRANSMISSION OPERATING MECHANISM
Filed Jan. 13, 1943  6 Sheets-Sheet 4
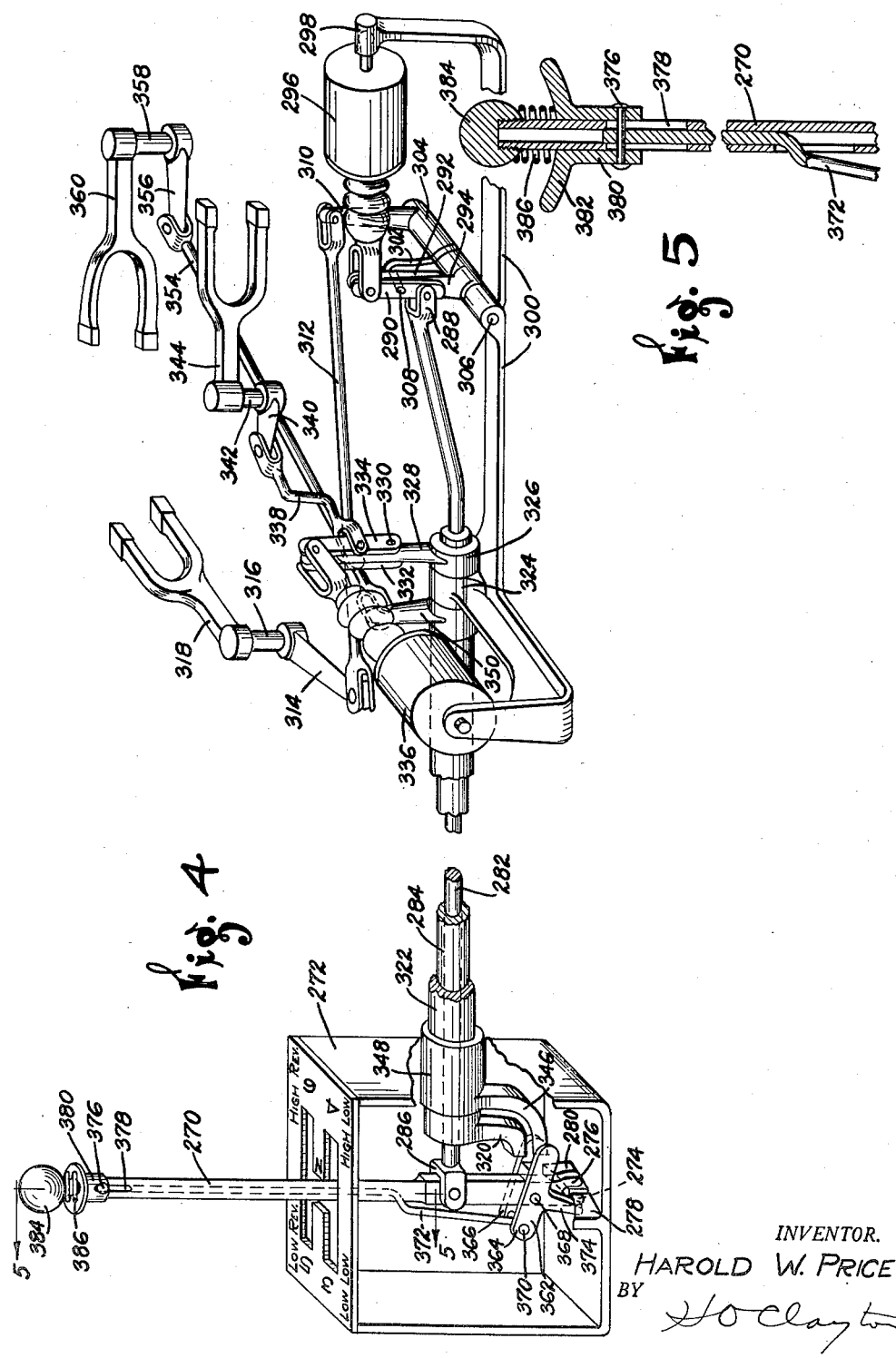
INVENTOR.
HAROLD W. PRICE
BY
H O Clayton May 22, 1951  H. W. PRICE  2,554,313
TRANSMISSION OPERATING MECHANISM
Filed Jan. 13, 1943  6 Sheets-Sheet 5

INVENTOR
HAROLD W. PRICE
BY

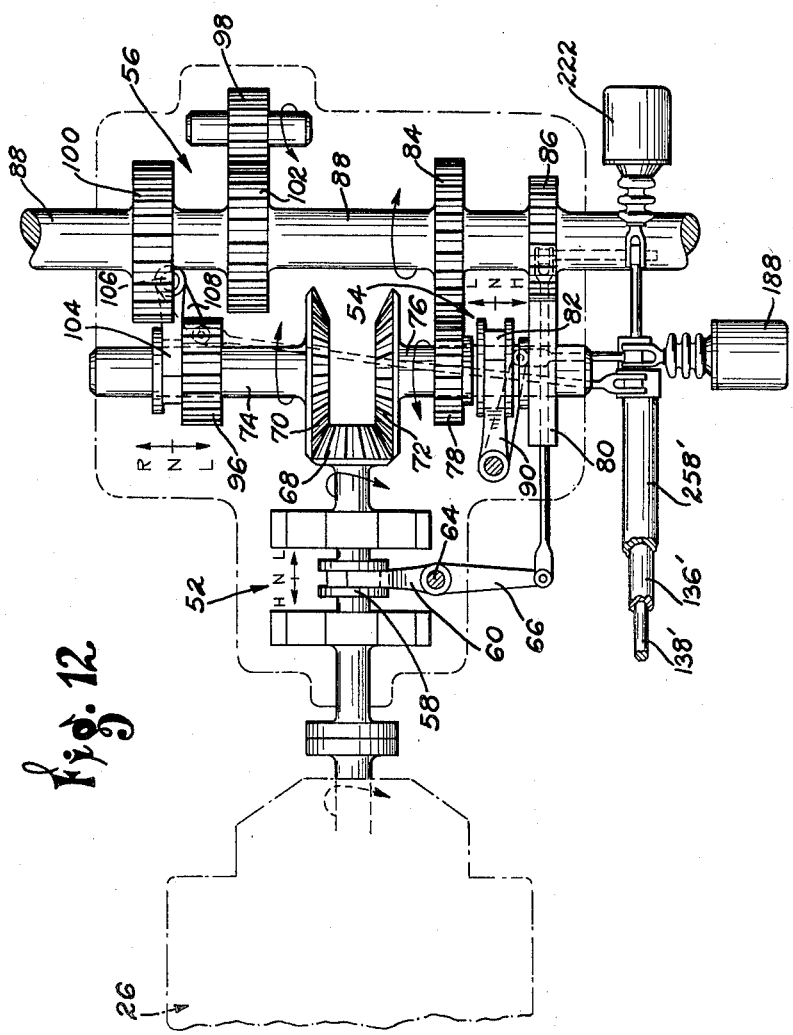

Patented May 22, 1951

2,554,313

UNITED STATES PATENT OFFICE 2,554,313

TRANSMISSION OPERATING MECHANISM

Harold W. Price, South Bend, Ind., assignor to Bendix Aviation Corporation, South Bend, Ind., a corporation of Delaware Application January 13, 1943, Serial No. 472,199

7 Claims. (Cl. 74—335)

This invention relates in general to transmission operating mechanism and more particularly to means for operating a six speeds forward and two speeds reverse transmission mechanism constituting a part of the power plant of a motor vehicle.

One of the objects of my invention is to provide an improved selector and actuating mechanism for obtaining the several speed ratios provided by the speed changing mechanism of a tank used for military purposes. It is apparent, however, that the transmission operating mechanism constituting my invention is not limited to use in a tank, for said mechanism may, with no changes in construction, be used to operate the change-speed transmission of an automotive vehicle.

My invention also contemplates the provision of means, including a plurality of pressure differential operated motors, for operating the change-speed transmission mechanism of a motor vehicle, said mechanism being capable of being established in any one of six forward speed settings or in either one of two reverse speed settings and said mechanism including three separate nests of gears or transmission units, the gears of each nest beinng operable to either establish one or the other of two gear ratio settings.

Yet another object of my invention to is to provide means for operating a six speeds forward and two speeds reverse transmission mechanism of a motor vehicle, said transmission mechanism including three separate cranks extending from the casing of the transmission; and a further object of my invention is to provide three separate force transmitting means for operating the aforementioned three cranks and also to provide a manually operable selector lever mechanism and interlock mechanism for operating and controlling the operation of said force transmitting means, the parts of said lever and interlock mechanism being so constructed and arranged and so operative that one of said cranks and one or the other of two of said cranks are actuated before the remaining crank may be actuated.

A further object of my invention is to so construct and arrange the parts of the transmission operating mechanism constituting my invention that one or the other of two of the nests of gears of the aforementioned transmission mechanism may be operated to establish a gear ratio setting when and only when the other of said nests of gears is neutralized.

Yet another object of my invention is to provide power and manually operated means for operating the change-speed transmission mechanism of a motor vehicle, said mechanism having six different forward speed settings and two different reverse gear settings and including among its parts three separate cranks extending from the casing of the transmission mechanism. A further object of my invention is to include in said operating mechanism a manually operable lever member having an H-movement.

An additional object of my invention is to provide means for operating a six speeds forward and two speeds reverse transmission including a plurality of transmission units, said means including one lever member movable in a plurality of different planes and further including another lever member movable in but one plane; and a further object of my invention is to so construct the connections between said levers and the transmission mechanism as to make it impossible to move the latter lever to establish one of the transmission units in gear until the former lever is moved to neutralize another of the transmission units.

Yet another object of my invention is to provide power means for operating a multi-speed transmission mechanism of a motor vehicle, said power means including a plurality of pressure differential operated motors, a selector lever, a follow-up valve for controlling the operation of each motor and means so interconnecting the selector lever, transmission mechanism, valve, and the power element of each motor that the operator in moving the selector lever to operate the transmission mechanism encounters a resistance or feel which is directly proportional to the transmission operating force exerted by the pressure differential operated motor in operation.

Yet another object of my invention is to provide, in the power plant of a motor vehicle, means for operating three different transmission units or nests of gears of a six speeds forward and two speeds reverse transmission mechanism, said means including three separate cranks extending from the casing of the transmission mechanism, two manually operated selector levers positioned adjacent the driver's seat of the vehicle and three separate force transmitting means interconnecting said cranks and levers.

A further object of my invention resides in the provision of an improved selector control mechanism for use with a change-speed transmission having eight different gear ratio settings, said mechanism being adapted for manual control with a minimum of effort and a maximum of safety to the operating parts. Yet another object of my invention is to so construct said selector control mechanism that the same is manipulated with a minimum of effort and attention on the part of the driver thereby increasing the safety of vehicle driving and the comfort of the driver.

Another object of the invention is to provide means, including a selector lever member positioned adjacent the driver of a motor vehicle and having an H-movement, for operating a change-speed transmission mechanism which may, by the operation of two cranks, be established in any one of three forward gear settings or a reverse gear setting and which may then, by the operation of another crank, be established in one or the other of two settings thereby providing a transmission capable of being established in any one of six forward gear settings or either one or the other of two reverse gear settings.

Other objects of the invention and desirable details of construction of parts will become apparent from the following detailed description of certain embodiments of the invention, taken in conjunction with the accompanying drawings illustrating said embodiments, in which:

Figure 1 is a perspective view diagrammatic in form illustrating my transmission operating mechanism incorporated in the power plant of a tank;

Figure 2 is a view, somewhat diagrammatic in form, disclosing one embodiment of the transmission operating mechanism constituting my invention;

Figure 3 is a view, similar to Figure 2, disclosing another embodiment of the transmission operating mechanism constituting my invention;

Figure 4 is a view, similar to Figures 2 and 3 disclosing the preferred embodiment of the transmission operating mechanism constituting my invention;

Figure 5 is a sectional view, taken on the line 5—5 of Figure 4, disclosing in detail a portion of the selector lever mechanism constituting the invention disclosed in Figure 4;

Figure 6 is a sectional view, taken on the line 6—6 of Figure 2 disclosing details of the interlock mechanism of the invention disclosed in the latter figure;

Figure 7 is a vertical sectional view taken through a portion of the transmission operating means disclosed in Figure 3 and disclosing the details of the interlock mechanism;

Figure 8 is a sectional view, taken on the line 8—8 of Figure 2, disclosing a part of the linkage interconnecting a part of the selector lever mechanism, a part of the transmission mechanism and a pressure differential operated motor, said linkage serving to effect the follow-up operation of the control valve of said motor and also to effect the so-called feel of the mechanism;

Figure 12 is a plan view of one form of six speeds forward and two speeds reverse transmission, which transmission is operated by the transmission operating mechanism constituting my invention.

Figure 9:
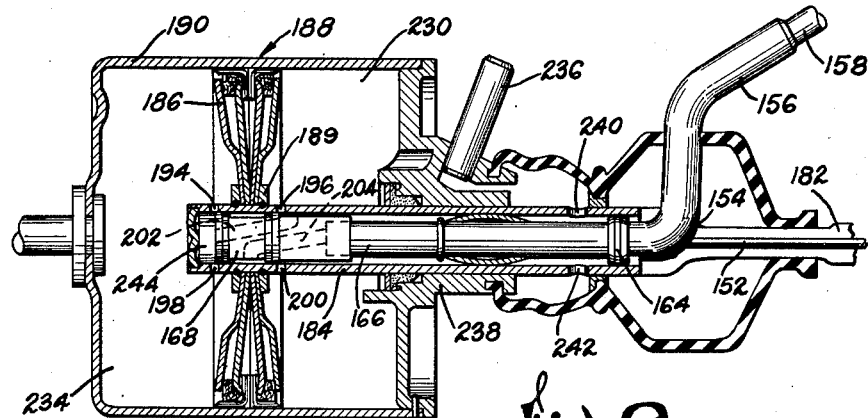
Figure 9 is a longitudinal sectional view disclosing the details of one of the pressure differential operated motors of the transmission operating mechanism constituting my invention, the piston, that is power element of said motor, and the parts of the control valve of said motor being in their transmission neutral position.

Referring now to Figure 1 there is disclosed in this figure a portion of the power plant of a military tank, said power plant including the transmission operating mechanism constituting my invention. It is to be understood, however, that my invention is not limited in its use to a tank; for it is obvious that both the change-speed transmission 10 and the means for operating it, all as disclosed in Figure 1, might be incorporated in the power plant of an automotive vehicle, i. e. a bus or a heavy-duty truck.

Completing the description of the power plant disclosed in Figure 1, the driver is seated in a seat 12 immediately to the rear of a steering wheel 14. A manually operated clutch pedal 16, serves through the intermediary of a hydraulic master cylinder 18 and fluid transmitting conduits 19 to control the operation of a hydraulic and vacuum operated motor 20, said motor serving, through the intermediary of a hydraulic slave cylinder 22, to operate a clutch mechanism, not shown, actuated by a crank 24. This clutch mechanism, preferably of the friction type, serves to interconnect an internal combustion engine 26 with the aforementioned six speeds forward and two speeds reverse transmission disclosed in detail in Figure 12. The accelerator 28 which may be operated by the right foot of the driver, serves, by means of a link 30 and a crank 32, to operate a hydraulic master cylinder 34, the latter being connected, by a fluid transmitting conduit 36, with a throttle operating hydraulic slave cylinder 38. The throttle mechanism, not shown, operated by the cylinder 38, constitutes a part of the means for controlling the operation of the engine 26. The clutch and throttle master cylinders 18 and 34 may be supplied with their power fluid from a fluid reservoir 40.

If desired, the tank may, as disclosed in Figure 1, be provided with a supplementary set of controls mounted adjacent an assistant driver's seat 42. These controls preferably include a steering wheel 44, a clutch pedal 46 and an accelerator 48 connected respectively with the above described steering wheel 14, clutch pedal 16 and accelerator 28. The clutch and throttle controls of the driver and assistant driver are shown mechanically interconnected. A cannon 50 is shown extending from an opening in a turret 51 and the tank is of course also armed with machine guns, not shown.

The power plant of the tank disclosed in Figure 1 has only been briefly described inasmuch as my invention resides in the hereinafter described and claimed mechanism, three embodiments of which are disclosed in the drawings, for operating a six speeds forward and two speeds reverse transmission, such for example as the transmission disclosed in Figure 12.

Describing now this transmission mechanism, the same consists of three separate nests of gears or transmission units indicated generally by the reference numerals 52, 54 and 56. No claim is made to the transmission disclosed in Figure 12; accordingly, the same is only briefly described. The nest of gears or unit 52 may consist of two planetary gear units controlled by a sliding gear 58, movable, by means of a crank 60, Figures 2 and 12, to establish the transmission unit 52 either in high gear or low gear or in neutral. As disclosed in Figure 2 the crank 60 is connected to the upper end of a shaft 64 and this shaft is journalled in bearings, not shown. To the lower end of the shaft 64 there is connected a crank 66 extending outside the casing of the transmission. As disclosed in Figure 12 the transmission unit 52 serves to interconnect the internal combustion engine 26 with the transmission units 54 and 56 and the unit 52 is neutralized, by the hereinafter described transmission operating mechanism constituting my invention, before either of the transmission units 54 or 56 is neutralized preliminary to the operation of establishing the remaining unit in gear.

The transmission unit 52 is connected to the transmission units or nests of gears 54 and 56 by means of a pinion 68, ring gears 70 and 72 meshed with said pinion and shafts 74 and 76 connected respectively with the gears 70 and 72. The nest of gears 54 includes gears 78 and 80 rotatably mounted on the shaft 76 and a gear member 82 slidably mounted and drivably connected with said shaft. The gears 78 and 80 are meshed with gears 84 and 86 respectively, the latter gears being drivably connected to a drive shaft 88 which is coupled at one of its ends with a magnetic slip clutch and final drive 89 and at its other end with a similar drive mechanism, not shown. The sliding gear 82 is actuated by means of a crank 90 forked at its end to embrace the gear, all as disclosed in Figures 2 and 12. As disclosed in Figure 2 the crank 90 is connected to the upper end of a shaft 92 and this shaft is journalled in bearings, not shown. To the lower end of the shaft 92 there is connected a crank 94 lying outside the casing of the transmission. To operate the transmission unit 54 the crank 90 is rotated to mesh the gear 82 with the gear 80 to establish the unit in its high gear setting, or mesh the gear 82 with the gear 78 to establish the unit in its low gear setting or position the gear 82 in its transmission neutral position as disclosed in Figure 12, that is in position between the gears 78 and 80 and out of mesh therewith.

Briefly describing the transmission unit 56 the same includes a sliding gear 96 slidably mounted on and drivably connected with the shaft 74, said gear being either moved into mesh with an idler gear 98 to effect a low gear setting of the transmission unit or into mesh with a gear 100 to effect a reverse gear setting of the transmission unit. The idler gear 98 is in constant mesh with a gear 102 drivably connected with the drive shaft 88. The nest of gears 56 are shown diagrammatically in Figure 12, the idler gear 98 being shown out of its true position, that is a position beneath the gear 102 where it may be meshed with the sliding gear 96. The latter gear is preferably operated by the forked end of a crank 104, Figures 2 and 12, and is shown in its transmission neutral position in Figure 12, that is a position where it is out of mesh with both the gear 100 and the gear 102. As disclosed in Figure 2 the crank 104 is connected to the upper end of a shaft 106 journalled in bearings, not shown. To the lower end of the shaft there is connected a crank 108 lying outside the casing of the transmission.

Referring now to Figures 1 and 2 disclosing one embodiment of the six speeds forward and two speeds reverse transmission operating mechanism constituting my invention, there is provided a manually operated selector mechanism positioned adjacent the driver's seat 12. This mechanism, as with the corresponding selector mechanism disclosed in Figures 3 and 4, includes two levers and the parts of said mechanism are so constructed and arranged that it is possible to move one or the other of said levers to establish one or the other of the transmission units 54 and 56 in gear when and only when the remaining lever is positioned to neutralize the other of said transmission units.

In the transmission operating mechanism of Figures 1 and 2 the selector lever mechanism includes two levers 110 and 112 approximately one-half of each lever being housed within a box 114. The lever 110 which is preferably longer than lever 112, is movable through slots in the detachable top plate 115 of the box 114, the extremities of said slots being indicated by the reference numerals 1-6 inclusive. The lever 110 outlines the letter H in successively moving to the positions 1 to 4 inclusive, outlines another letter H in successively moving to the positions 3 to 6 inclusive and outlines yet another letter H in successively moving to the positions 1, 2, 5 and 6. These gear shifting movements of the lever 110 are effected in cooperation with an operation of the lever 112, all as is described hereinafter. As disclosed in Figure 2 the lever 112 extends through a slot in the top plate 115 and, as described above, may be moved from its transmission neutral position, that is the position of the lever disclosed in Figure 2, to either its low gear position, indicated by the word "Low," or to its reverse gear position, indicated by "Rev," when and only when the lever 110 is positioned somewhere in the slot 1, 2 that is when the transmission unit 54 is neutralized.

Continuing the description of the transmission operating mechanism disclosed in Figures 1 and 2, the selector levers 110 and 112 are connected by three separate force transmitting means with the aforementioned cranks 66, 94 and 104. Describing these three force transmitting means and associated parts including interlock means, there are provided two support members 116 and 118, Figure 2, secured to some part of the chassis of the tank or a part fixedly secured thereto. The support member 116 is provided with two cylindrical openings, one of said openings receiving therethrough a rod 120 having bifurcated ends. The lever 112 is straddled by the furcations of one end of the rod 120 and a pin 122 extending through said furcations and lever serves as a means for pivotally connecting said lever and rod. The lever 112 is pivotally mounted, that is fulcrumed, upon a pin 124 extending through said lever intermediate its ends and through the furcations of the bifurcated end of a curved support arm 126 secured to and extending from the support member 116. The lever 110 is pivotally mounted, intermediate its ends, upon a pin 128 extending through said lever and the furcations of the bifurcated end of a curved arm 130. The latter arm is preferably cylindrically shaped at its lower end 132, Figure 6, said end being sleeved over and keyed by a pin 134, to a tubular member 136 which extends through one of the openings in support member 116. Through the lower end of the lever 110 there extends a pin 137, the ends of said pin extending through furcations of the bifurcated end of a rod 138; and said rod extends through the tubular member 136.

Completing the description of the force transmitting means interconnecting the lever 112 with the crank 108, the furcations at one end of the rod 120 receive a pin 140 which extends through the end of one arm of a bell crank lever 142 which is pivotally mounted on a portion of the support member 118, all as disclosed in Figure 2. A rod 144, bifurcated at both of its ends, is pivotally connected at one of said ends, to an arm of the bell crank lever 142 and is pivotally connected at its other end to the aforementioned crank 108. The transmission unit 56 is therefore connected with the selector lever 112 by force transmitting means including rod 120, bell crank lever 142, rod 144, crank 108, shaft 106 and crank 104.

Completing the description of the force transmitting means for operating the nest of gears or transmission unit 54, the tubular member 136 is enlarged at one of its ends to provide a hub portion 146 from which extends a crank 148. The upper end of the arm 148 is pivotally connected to a link 152, Figure 9, said link being welded at 154 to a relatively short nipple 156. As disclosed in Figure 1 a flexible conduit 158 is connected to interconnected pipes 160 and 162, the latter being connected to the intake manifold of the internal combustion engine 26. The nipple 156 is connected at 164 to a hollow rod and the other end of said rod is tightly fitted within a recess in the end of a spool-shaped valve member 168. Reaction lever members 170 and 172, Figure 2, are pivotally connected intermediate their ends, to a pin 174 mounted in the furcations of the bifurcated end of a link 176 pivotally connected at its other end to the aforementioned crank 94. The pin 174 extends through an opening in the crank 148 to make possible a relative movement of said crank and the lever members 170 and 172, all as described hereinafter. The construction and arrangement of the lever members 170 and 172 and crank 148 duplicate the corresponding elements of the mechanism disclosed in Figure 8. This figure of the drawing discloses a part of the force transmitting means interconnecting the lever 110 and transmission unit 52. The lever members 170 and 172 are pivotally connected by a pin 178 to the crank 148 and the upper ends of said members are pivotally connected by a pin 180 to the yoke-shaped end 182 of a hollow connecting rod 184. The arms of the yoke 182 straddle the link 152 and nipple 156, all as disclosed in Figures 9, 10 and 11. The pin 180 extends through an opening in the end of the crank 148, thereby making possible a relative movement of the crank 148 and lever members 170 and 172.

The power element, that is piston 186, of a pressure differential operated motor 188 is fixedly secured to a hereinafter described valve member 189 constituting the end portion of the connecting rod 184, said piston being reciprocable within the cylinder 190 of said motor. As disclosed in Figure 2 the motor 188 is pivotally mounted by a ball and socket connection 192, to an arm portion of the support 118. The aforementioned end portion 189 of the hollow rod 184 is ported at 194, 196, 198 and 200, said portion thereby constituting one of the two parts of the control valve of the motor 188, the remaining part being the aforementioned spool-shaped member 168. This valve member 168 is bored, as dislosed in Figures 9, 10 and 11, to provide ducts 202 and 204.

Describing now the third of the transmission operating force transmitting means, namely that force transmitting means for operating the transmission unit 52, the lever 110, as previously described, is pivotally connected at its lower end to the rod 138 which is slidably mounted within the aforementioned tubular member 136. As disclosed in Figures 2 and 8 the rod 138 is bifurcated at its other end and a pin 206 extends through the furcations of said end portion, through the lower end of reaction lever members 208 and 210 and through a crank 212 pivotally mounted upon a pin 214 tightly fitted within a recess in a portion of the support member 118. The furcations of the bifurcated end of a rod 216 are pivotally connected by a pin 218 to the lever members 208 and 210, said pin as disclosed in Figure 8, extending through an opening in the crank 212. The rod 216 is pivotally connected at 220 to the aforementioned crank 66 extending from the lower end of the shaft 64.

The remainder of the force transmitting means for operating the transmission operating unit 52 consists of a pressure differential operated motor 222 and the connections between the power element of said motor and the above described reaction levers 208 and 210. The construction and arrangement of the parts of said connections, the motor 222, the control valve housed therein and the connection between the valve and crank 212 duplicate the same parts disclosed in Figures 9, 10 and 11 and which parts have been described above.

Referring now to Figure 6, there is disclosed therein one of the important features of the invention disclosed in Figure 2, that is the interlock means cooperating with the slotted cover plate 115 of the box 114 to make possible a gear selecting operation of the transmission unit 56 when and only when the transmission unit 54 is neutralized; also to make possible a gear selecting operation of the transmission unit 54 when and only when the transmission 56 is neutralized. This interlock means consists of a pin 224 housed within a slot in the support member 116, said slot extending parallel or substantially parallel to the base of said member. The ends of the pin 224 are rounded, one end being adapted to fit within an opening 226 in the tubular member 136 and the other end within a recess 228 in the rod 120. The operation of this interlock mechanism is described hereinafter.

Describing now the operation of the above described transmission operating mechanism, that is the mechanism disclosed in Figures 1, 2, 6, 8, 9, 10, 11 and 12, when the driver wishes to start the tank in motion in first gear or what may also be termed low, low gear, he will probably first disengage the friction clutch by depressing the clutch pedal 16 regardless of whether or not the transmission unit 52 is in neutral. Then after the engine is cranked, thereby idling the same to create a source of vacuum in the intake manifold, the driver will, if the three transmission units 52, 54 and 56 are not already neutralized, move the selector levers 110 and 112 to the positions disclosed in Figure 2, that is their position to neutralize said transmission units. The lever 112 is then positioned in the center of the low reverse slot in the plate 115 and the lever 110 is positioned in the center of the slot which may be defined as slot 1, 2 and is also positioned in the center of the cross-over slot indicated by the letters C and O and extending across the plate 115. Now when the selector lever 110 is in its transmission neutral position as disclosed in Figure 2, the pin 224 registers with the opening 226 in the tubular member 136 thereby making it possible to move the lever 112 to either its low gear or reverse gear position indicated by the aforementioned indicia "Low" and "Rev" in Figure 2; for upon examining Figure 6 it will be noted that when the rod 120 is moved in either direction the pin 224 will be moved bodily, one end of the same moving into the opening 226 and the other end being forced out of the recess 228.

At this juncture it is also to be noted that by virtue of the above described interlock mechanism it is not possible to move the selector lever 110 laterally to operate the transmission 54 if the selector lever 112 is in either its low gear or reverse gear position; for when the transmission unit 56 is established in either low gear or reverse gear the end of the pin 224 is positioned in the opening 226 thereby preventing a rotation of the lever 110. In other words, as stated above, it is impossible by virtue of the interlock mechanism of the invention, to establish the transmission unit 54 in gear when the transmission unit 56 is in gear and vice versa it is impossible to establish the transmission 56 in gear when the transmission unit 54 is in gear.

Continuing the description of the operation of the mechanism to establish the transmission mechanism in low, low gear, the driver will move the shift lever 112 to the position marked "Low" thereby manually operating the crank 108 to establish the transmission unit 56 in its low gear setting. The driver will then move the selector lever 110 to its low gear position, that is the position indicated by the reference numeral 1, thereby establishing the transmission unit 52 in its low gear setting and establishing the entire transmission mechanism in its low, low or first gear setting.

Figure 10:
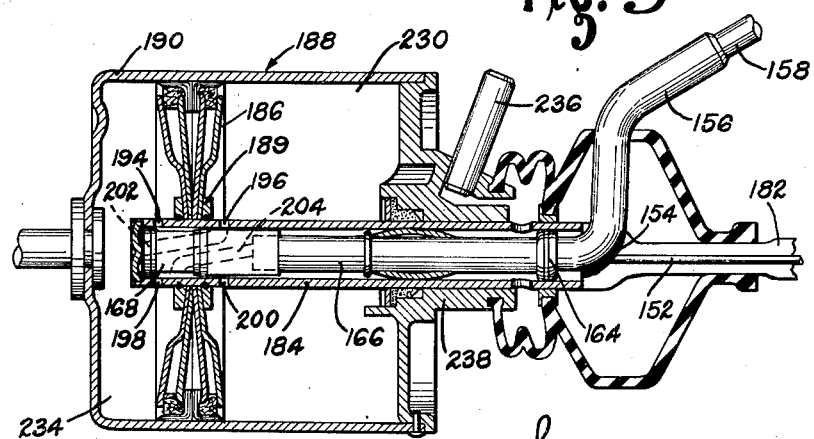
Figure 10 is a view similar to Figure 9 disclosing the power element of the pressure differential operated motor in one of its operative positions, that is in one of its gear established positions.
Figure 11:
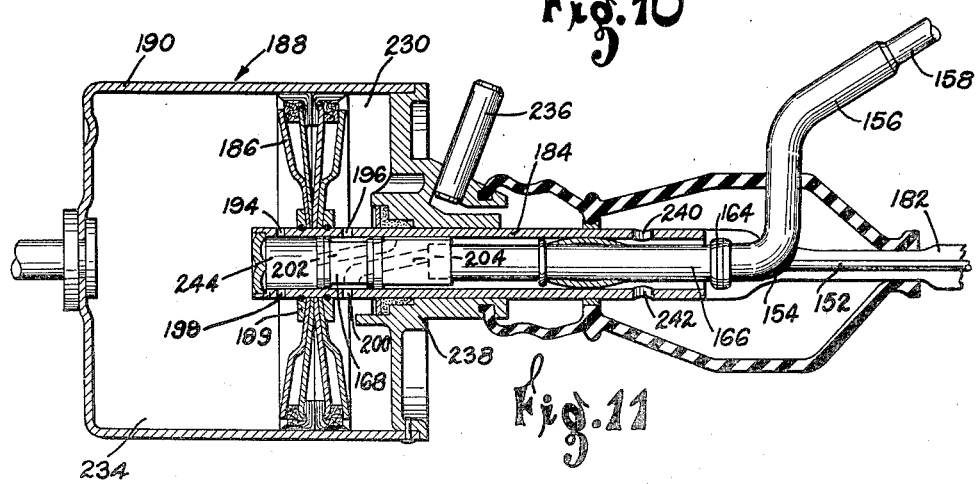
Figure 11 is a view, similar to Figure 10, disclosing the power element of the pressure differential operated motor in the other of its gear established positions.

Describing now the operation of the pressure differential operated motor 222 which description also applies to the motor 188, the two motors being of identical construction; and also describing the operation of the force transmitting means interconnecting the selector lever 110 with the crank 66, when said lever is moved from its transmission neutral position toward its low gear position, the rod 138 is tensioned to move the same to the left, Figure 2, thereby rotating the crank 212 counterclockwise and rotating the reaction levers 208 and 210 clockwise about the pin 218. The pin 218 is held stationary at this time inasmuch as the force necessary to move the rod 216 and the sliding gear 58 connected thereto is greater than the force required to move the piston of the motor 222 to the right, Figure 2. At this juncture it is to be remembered that as to the motor 222, the piston, valve and other parts therein are duplicates of the corresponding parts of the motor 188 disclosed in Figures 9, 10 and 11. In the following description of the operation of the motor 222 reference will be made therefor to the parts of the motor 188. Now the aforementioned rotation of crank 212 and the reaction levers 208 and 210 results in a relatively quick valve opening movement of the valve members 168 and 189; for the piston 186 and the valve member 189 connected therewith are moved to the right, Figure 2, and the valve member 168 is moved to the left. Referring now to Figures 9 and 11, the piston 186 and the valve member 189 will, with this operation, be moved to the left from the transmission neutral position of said members disclosed in Figure 9; and the valve member 168 will be moved to the right. The valve members then assume the relative positions disclosed in Figure 11; however, said members will be located near the center of the cylinder 190. A compartment 230 of the pressure differential operated motor is by this valve opening or valve cracking operation connected to the intake manifold of the engine 26 via a conduit 232, nipple 156, hollow rod 166, duct 204 in the valve member 168 and the ports 196 and 200 in the valve member 189. A compartment 234 of the motor is, by this operation of the valve mechanism, connected to the atmosphere via a nipple 236 mounted in an end plate 238 of the cylinder 190, ports 240 and 242 in the hollow connecting rod 184, the duct 202 in the valve member 168, a compartment 244 outlined by the end of the rod 184 and the end of the valve member 168, and ports 194 and 198 in the valve member 189. The compartment 230 is then partially evacuated and this results in the piston 186 being subjected to a differential of pressures with a consequent movement to the left, Figure 2, to establish the transmission unit 52 in its low gear setting; and it is to be noted that the piston 186 and the valve member 189 connected thereto are moved to the right in Figure 2 when the valve is opened and that these parts then reverse their direction of movement when the motor is energized, all as just described.

Now when the sliding gear 58 of the transmission unit 52 contacts the gear or other member to be meshed therewith, said gear 58 will be momentarily stopped, whereupon the force exerted by the piston 186 to mesh said gears will be increased by virtue of the fact that the efflux of air from the compartment 230 is continued so long as said compartment remains connected to the intake manifold. The period of interruption of movement of the gear 58 will of course be of very short duration inasmuch as said gear, which is covered with lubricant, will quickly slip into mesh with the gear to be interlocked therewith. Now it is to be noted that as a result of this interruption and the above referred to continued evacuation of air from the compartment 230, the resistance to movement of the selector lever 110 will be increased in direct proportion to the increase in differential of pressures acting on the piston 186; and this reaction or resistance to movement of the selector lever 110 is known in the art as feel. Explaining the operation of the mechanism to effect this so-called feel, it is to be noted that the reaction levers 208 and 210 are, with the above described operation of the force transmitting linkage, acting as levers of the first class, the fulcrum of said levers being located at the pin 218 and the two loads upon the levers being exerted at their ends. It follows therefore that as the load exerted by the piston 186 increases, said load being applied at the pin 218, the load exerted by the physical effort of the driver increases, said load being applied at the pin 206. It follows therefore that throughout the entire operation of moving the gear 58 from its transmission neutral position to its meshed position the driver will do a part of the work to effect this meshing of the gears, the amount of said work and the amount of force exerted by the driver being directly proportional to that effected by the pressure differential operated motor.

It is also to be noted that the above described transmission operating mechanism provides what is known in the art as a follow-up control of the motor; for if perchance the driver should stop the movement of the selector lever 110 before the gear 58 abuts the gear or other member with which it is meshed then the movement of the pin 206 will be stopped. The movement of the pin 218 will, however, be continued until the valve mechanism is lapped to place the system in equilibrium. Describing this lapping operation of the valve mechanism and referring to Figure 11, when the valve part 189 is moved to the right sufficiently to bring the ports 196 and 200 over a land portion 246 of the valve member 168, then the compartment 230 will be cut off from the intake manifold and the parts of the mechanism will remain in their then existing relative positions, that is the lapped position of the valve mechanism, until the selector lever 110 is again moved to crack the valve mechanism.

It is also to be noted that if for any reason the motor 222 should fail to function the transmission unit 52 would then be operated solely by the physical effort of the driver; for after the clearance between the pin 218 and the surrounding opening in the crank 212 is taken up, then the rod 216 would be moved solely by said physical effort.

At this juncture it may also be observed that if the transmission units 52 and 54 are each equipped with a synchronizing mechanism to provide what is known in the art as a synchromesh transmission, then the above described follow-up and feel operations of the transmission operating mechanism of my invention will be particularly effective to control the operation of said transmission units; for when the clutches or blockers of said synchro-mesh mechanism are operating to synchronize the speeds of the gears to be meshed, the driver will, by virtue of the above described resistance to movement of the selector lever 110, be conscious of the operation of the synchronizing mechanism and will probably refrain from unnecessarily forcing the selector lever toward its gear established position.

Briefly reviewing the description of the operation of the piston and valve parts, when the transmission unit 52 is in its neutral position, said piston and valve parts are in the position disclosed in Figure 9 and when said transmission unit is established in its low gear setting the piston and valve parts are in the positions disclosed in Figure 11.

Continuing now the description of the operation of the power plant as a whole, the transmission mechanism having been established in its low, low setting by the above described operation of placing the transmission units 52 and 56 in their low gear settings, the driver then re-engages the friction clutch by releasing the clutch pedal 16 and at the same time depresses the accelerator 28 to open the throttle and speed up the engine. When the tank has reached the desired speed in the low, low setting of the transmission, the driver will then probably operate the transmission to establish the same in its high, low, that is second gear, setting. This is effected by first disengaging the friction clutch to uncouple the engine from the transmission mechanism and then moving the selector lever 110 from its low gear position to its high gear position indicated by the reference numeral 2, Figure 2. With this operation, the rod 138 is placed in compression, thereby effecting a counterclockwise rotation of the valve operating reaction levers 208 and 210 and a clockwise rotation of the valve operating crank 212. The motor 222 is thus again energized and this operation of the motor serves, together with the physical effort of the driver, to establish the transmission unit 52 in its high gear position. As to this operation of the motor 222 and the other parts of the force transmitting means for operating the transmission unit 52, the cycle of operations of the valve operating and force transmitting linkage will not be given in detail inasmuch as said operations are merely the reverse of the heretofore described operations for effecting the low gear setting of said transmission unit. It will suffice to say that the valve members 168 and 189 are first moved from the relative positions disclosed in Figure 11 to the relative positions disclosed in Figure 10, not the actual positions of these parts as disclosed in Figure 10, whereupon the compartments 234 and 230 are connected to the intake manifold and the atmosphere respectively. The piston 186 then moves to the left to the position disclosed in Figure 10 thereby moving the gear member 58 to its meshed position to establish the transmission unit 52 in its high gear position. The transmission mechanism as a whole is then established in its second gear setting. As to the above described follow-up operation of the valve members and the feel or resistance to movement of the selector lever, these functions of the mechanism are the same as those previously described in effecting the low, low or first gear setting of the transmission mechanism.

The transmission mechanism having been established in its second gear setting, the driver will then re-engage the friction clutch and depress the accelerator to increase the speed of the tank.

The desired speed of the tank having been attained the driver may then desire to establish the transmission mechanism in its third speed setting. As before, the accelerator is first released and the friction clutch disengaged whereupon the driver neutralizes the transmission units 52 and 56 by returning the selector levers 110 and 112 to their transmission neutral positions shown in Figure 2; and then the driver rotates the selector lever 110 to the right, Figure 2, into the center of the slot 3, 4, that is the position indicated by the letter O. This operation serves to rotate the tubular member 136 clockwise thereby rotating the crank 148 clockwise and the reaction levers 170 and 172 counterclockwise. This operation is possible inasmuch as the pin 174 is, for the reason described above, at the time stationary thereby acting as a fulcrum for the levers 170 and 172 and the crank 148 is provided with a relatively large opening, not shown, through which said pin extends. The valve members 168 and 189 of the motor 188 are therefore moved in opposite directions to crank the valve and the valve member 189 at the hub of the piston, then reverse its direction of movement, all as previously described. As previously described the motor 188 is thus energized, the crank 148 being moved counterclockwise thereby moving the gear 82 into mesh with the gear 78 to establish the transmission unit 54 in its low gear setting.

To complete the third speed setting of the transmission mechanism the driver then moves the selector lever 110 in the slot 3, 4 to the end of said slot indicated by the reference numeral 3, Figure 2; and this operation serves to repeat the above described low gear operation of the force transmitting means for operating the transmission unit 52. In other words, the transmission unit 52 is again established in its low gear setting after the transmission unit 54 is established in its low gear setting. The driver then re-engages the friction clutch and speeds up the tank to attain the desired speed in the third speed setting of the transmission.

To establish the transmission in its fourth gear ratio setting the driver, after again releasing the accelerator and disengaging the friction clutch to reverse the torque, moves the selector lever 110 to its fourth speed position indicated by the reference numeral 4 in Figure 2; and this operation serves to repeat the above described operation of establishing the transmission unit 52 in its high gear setting. The driver then reengages the friction clutch and depresses the accelerator to attain the desired speed of the tank.

To establish the transmission mechanism in its fifth gear ratio setting the driver, after releasing the accelerator, will in succession disengage the friction clutch, neutralize the transmission unit 52 by returning the selector lever 110 to its transmission neutral position O, then move said lever laterally through the cross-over slot C, O into the position C in the slot 5, 6 and lastly will move the lever 110 to the position indicated by the reference numeral 5. This cross-over operation of the selector lever 110 serves to effect an operation of the motor 188 to establish the transmission unit 54 in its high gear setting, the operation of the reaction levers 170 and 172 and crank 148 being just the reverse of the above described operation of said parts in establishing said transmission unit in its low gear position; and by moving the lever 110 from the position C to the position 5 in the slot 5, 6 the motor 222 is again energized to again establish the transmission unit 52 in its low gear setting.

To complete the forward speed cycle of shifting operations of the six speeds forward and two speeds reverse transmission mechanism 10, the driver, after the tank has attained the desired speed in the fifth speed setting of said transmission mechanism, moves the selector lever 110 to the position indicated by the reference numeral 6 in Figure 2; and this operation serves to again establish the transmission unit 52 in its high gear setting and complete the operation of establishing the transmission mechanism 10 in its sixth speed setting.

To effect the two reverse speed settings of the transmission mechanism 10 the driver first brings the tank to a stop with the engine idling whereupon he neutralizes the transmission units 52 and 54 by moving the selector lever 110 to the positions disclosed in Figure 2. He then, in succession, moves the selector lever 110 to its reverse speed position and the selector lever 112 to either its first or second speed positions depending of course upon the gear ratio desired.

There are disclosed in Figures 3 and 4 other embodiments of the transmission operating mechanism constituting my invention. Referring to Figure 3, this embodiment of my invention duplicates the previously described embodiment disclosed in Figure 2 with the exception of the force transmitting means for operating the transmission unit 56; and there is also a simplification of the support member adjacent the box housing the selector levers. Those parts of the mechanism of Figure 3 which are duplicates of the corresponding parts in the mechanism of Figure 2 are indicated by the reference numerals of the latter parts plus a prime.

Describing the mechanism disclosed in Figure 3 which differs from the mechanism of Figure 2, the mechanism of Figure 3 includes a box 250 which may be detachably secured to the floor of the tank adjacent the driver's seat. This box, the sides and slotted top of which are preferably detachably secured together, serves to house selector levers 110' and 252 and a support member 254 which is preferably detachably secured in position. The two force transmitting means interconnecting the lever 110' with the transmission units 52 and 54, Figure 12, will not be described in detail inasmuch as said means duplicate the force transmitting means of the mechanism disclosed in Figure 2.

Describing in detail the force transmitting means for operating the transmission unit 56 the selector lever 252 extends through a slot in the top plate of the box 250 and is enlarged at its lower end to provide a hub portion 255, Figure 7, which is sleeved over and secured by a key 256 to a tubular shaft 258. As disclosed in Figure 7, the shaft 258 telescopingly receives a tubular member 136' and a rod 138', the latter being fitted within the member 136'. The other end of the shaft 258 is enlarged to provide a hub member 260 to which is secured a crank 262; and the force transmitting means interconnecting the crank 262 with the sliding gear 96 of the transmission unit 56 includes a rod 144', pivotally connected at one of its ends to said crank 262 and at its other end to a crank 108'. The crank 108' is connected to a shaft 106' journalled in bearings in the casing of the transmission 10; and a crank 104' forked at its end to embrace the gear 96 and connected to the shaft 106' completes the connection.

There is also provided means, in the mechanism disclosed in Figure 3 and corresponding to the mechanism disclosed in Figure 6, for preventing a meshing of gears of either the transmission unit 54 or the unit 56 when the other of said transmission units is established in gear. As disclosed in Figure 7 this interlock means consists of a pin 264 extending through an opening in the support member 254, said pin having rounded ends, one end 266 adapted to fit within a recess in the hub 255 when and only when the lever 252 is in its transmission neutral position and the other end 268 of said pin adapted to fit within a recess in a hub member 270 of a curved arm 139' when and only when the lever 110' is in position to neutralize the transmission unit 54. With this construction it is apparent that the selector lever 110' may be rotated to establish the transmission unit 54 in gear when and only when the selector lever 252 is in its transmission neutral position as disclosed in Figure 3; and the selector lever 252 may be rotated to establish the transmission unit 52 in gear when and only when the selector lever 110' is located somewhere in the slot 1, 2, preferably the center thereof.

The operation of the transmission operating mechanism of Figure 2 having been described in detail, it will not be necessary to describe at great length the operation of the mechanism disclosed in Figure 3. Suffice it to say that having moved the selector lever 110' into the slot 1, 2 to thereby neutralize the transmission unit 54, the selector lever 252 may then be moved to either its reverse or low gear position. Should any one of the third, fourth, fifth or sixth forward speed settings of the transmission mechanism be desired the driver, after reversing the driving torque by releasing the accelerator and disengaging the friction clutch, will first neutralize the transmission unit 56 by moving the selector lever 252 to its transmission neutral position N and he will then operate the transmission units 52 and 54 by moving the lever 110 to the position to effect these operations, that is to any one of the positions numbered 3, 4, 5 or 6 in the top plate of the box 250.

Referring now to Figure 4 disclosing the preferred embodiment of my invention, as with the embodiment of my invention disclosed in Figures 2 and 3, there is provided three independently operable force transmitting means interconnecting the manually operable selector mechanism with the three transmission units 52, 54 and 56 of Figure 12.

Describing the force transmitting means for operating the transmission unit 52 a selector lever 270, tubular throughout a major portion of its length, is housed within a box 272 mounted adjacent the driver's seat. The lower end of said lever is provided with furcations 274 and 276 which straddle flanges 278 and 280 rectangular in cross section. These flanges extend crosswise of the box 272 and are preferably integral with the base portion thereof. A rod 282 slidably mounted within a tubular shaft 284 is pivotally connected at one of its ends 286 to the lever 270 and is pivotally connected at its other end 288 to reaction levers 290 and 292 and a crank 294. As with the above described embodiments of my invention the crank 294 and reaction levers 290 and 292 are connected to the relatively movable parts of a control valve of a pressure differential operated motor, said motor, indicated by the reference numeral 296, being a duplicate of the motor disclosed in Figures 9, 10 and 11. The motor is pivotally supported at 298 to an arm of a support member 300. As with the mechanism disclosed in Figures 2 and 3 the reaction levers 290 and 292 are pivotally connected to force transmitting means interconnecting said levers with the sliding gear 58 of the transmission unit 52. This force transmitting means differs, however, from the corresponding force transmitting means of the mechanism disclosed in Figures 2 and 3 and includes a crank 302 extending from and preferably integrally secured to a shaft 304 rotatably mounted upon a pin 306 fixedly secured to the support member 300. The hub portion of the crank 294 is of course also rotatably mounted on the pin 306. From the end of the crank 302 there extends a pin 308 which pin extends through the reaction levers 290 and 292 intermediate their ends. The pin also extends through a relatively large opening in the crank 294 to make possible the above described movement of the parts of the control valve in opposite directions to open the valve.

Completing the description of the force transmitting means for operating the transmission unit 52 to one end of the shaft 304 there is secured a crank 310 which is pivotally connected at its end to one end of a rod 312. The other end of the rod 312 is pivotally connected to a crank 314 extending from one end of a shaft 316 journalled in bearings mounted in the transmission casing 10; and to the upper end of the shaft 316 there is connected a crank 318 forked at its end to embrace the sliding gear 58 of the transmission unit 52.

Now inasmuch as the motor 296, its control valve and the reactionary links and crank for operating said valve duplicate the corresponding mechanism disclosed in Figures 2, 3, 9, 10 and 11 which have been described above, it follows that it is unnecessary to repeat the description of the operation of said mechanism.

Describing now the force transmitting means for operating the transmission unit 54, said means includes a crank 320 keyed to one end of the aforementioned tubular shaft 284, said shaft being rotatably mounted within a tubular shaft 322 and journalled in a bearing 324 constituting a part of the support member 300. The other end of the tubular shaft 284 is enlarged at 326 to provide the hub portion of a crank 328 and said crank is pivotally connected at 330 to reaction levers 332 and 334. Duplicating the mechanism disclosed in Figures 2 and 3 the remainder of the force transmitting means for operating the transmission unit 54 includes a pressure differential operated motor 336, a link 338 pivotally connected to the levers 332 and 334 and to a crank 340. The latter crank is secured to one end of a shaft 342 which is journalled in bearings mounted in the transmission casing 10; and a crank 344, forked at its end to embrace the sliding gear 58, is connected to the other end of the shaft 342.

The force transmitting means for operating the transmission unit 56 includes a crank 346 extending from a tubular member 348 preferably keyed to one end of the aforementioned tubular shaft 322. The other end of the shaft 322 abuts the bearing 324 of the support member 300 and this end of said shaft is preferably enlarged to provide the hub portion of a crank 350. The latter crank is pivotally connected to one end of a link 354 and said link at its other end is pivotally connected to a crank 356. The crank 356 is connected to a shaft 358 which is journalled in bearings mounted in the transmission casing 10 and to the upper end of said shaft there is secured a crank 360 forked at its end to embrace the sliding gear 96 of the transmission unit 56.

Describing now the operation of the preferred embodiment of my invention disclosed in Figure 4 and incidentally completing the description of the manually operated selective lever mechanism for operating the above described force transmitting means, if the driver wishes to establish the transmission mechanism in its low gear setting he first moves a two-part lever 362 into position to operate the crank 346. Describing the means for effecting this operation the lever 362 consists of plates 364 and 366 pivotally connected to the lever 270 by a pin 368 and pivotally connected by a pin 370 to a rod 372 which extends through the tubular portion of the lever 270 as disclosed in Figure 5. The plate 364 of the two-part lever 362 is provided with a downwardly extending finger 374. To the upper end of the rod 372 there is connected a pin 376 which extends through a slot 378 in the lever 270. To the pin 376 there is secured a relatively short tubular member 380 provided with a flange 382.

Now when the driver wishes to establish the transmission mechanism in its low, low, that is first gear ratio setting he places the palm of his hand upon a ball 284 secured to the end of the lever 270 and then, with his fingers, lifts the member 380 upwardly, against the tension of a spring 386, to the position disclosed in Figures 4 and 5. As will be apparent from the disclosure of the mechanism shown in Figure 4, this operation will effect a clockwise rotation of the two-part lever 362 moving one end of the same opposite the end of the crank 346. It is to be particularly noted that this operation is only possible when the lever 270 is in the position disclosed in Figure 4 and indicated by the letter N; for when the lever 270 is in this position the furcations 274 and 276 of said lever are positioned immediately adjacent the space between the flanges 278 and 280 thereby making possible a movement of the finger 374 through said space when the lever 362 is rotated to select the crank 346. It is also to be noted that when the lever 270 is in the position disclosed in Figure 4, the transmission units 52 and 54 are neutralized and the transmission unit 52 may not be operated to establish the same in gear; for when the lever 270 is in this position it abuts portions of the cover plate of the box 272 and may not be moved to any one of the four gear establishing positions in the ends of the slots in said plate.

Continuing the description of the operation of the mechanism disclosed in Figure 4, to effect the low gear setting of the transmission unit 56, having actuated the lever 362 to make possible an operation of the crank 346, the lever 270 is then rotated counterclockwise about its pivotal connection with the rod 252, the upper end of said lever moving into the slot 3, 4. This operation serves to rotate the crank 346 counterclockwise, thereby rotating the crank 350 and, through the intermediary of the above described connections, establish the transmission unit 56 in its low gear setting. The driver then moves the lever 270 in the slot 3, 4 to its low, low position, said position being so indicated in Figure 4 of the drawings, thereby establishing the transmission unit 52 in its low gear position and completing the operation of establishing the entire transmission mechanism in its first gear ratio setting. The friction clutch is then re-engaged and the accelerator depressed to attain the desired speed of the tank in said first gear setting.

Should the driver then desire to establish the transmission mechanism in its high, low, that is second gear setting, he merely has to move the lever 270 into its high, low position, Figure 4, it being understood of course that this operation is facilitated by first disengaging the friction clutch.

To establish the transmission in either of its low reverse or high reverse settings, the driver will, after actuating the lever 362 so that the two parts thereof straddle the end of the crank 346, move the lever 270 from its neutral position N into the channel 5, 6 thereby manually operating the transmission unit 56 to establish its reverse gear setting. The lever 270 is then moved to either the low reverse or high reverse position depending upon the transmission setting desired, this operation serving to operate the transmission unit 52. It is to be noted that in effecting the operation of the transmission unit 52 the lever 270 fulcrums at its lower end, the furcations 274 and 276 pivoting upon one or the other of flanges 278 and 280.

To operate the transmission mechanism to establish the same in any one of its third, fourth, fifth, or sixth speed settings, the driver first moves the lever 270 laterally to establish the transmission unit 54 in the desired setting and then moves said lever either forwardly or backwardly to establish the transmission unit 52 in the desired setting. It is to be noted that to effect these four settings of the transmission mechanism the member 380 is not lifted upwardly to actuate the lever 362; for the spring 386 interposed between the ball 384 and the flange 382 serves to bias the lever member 362 into position to operate the crank 320, said crank constituting a part of the force transmitting means for operating the transmission unit 54.

Reviewing the features of the transmission operating mechanism disclosed in Figure 4, it is to be noted that, as with the mechanisms disclosed in Figures 2 and 3, there are provided three separate force transmitting means for operating three separate transmission operating cranks extending from the transmission casing and there is also provided a manually operable selector lever and interlock mechanism for operating said force transmitting means. In the mechanism if Figure 4, the lever 362, finger 374, space between the flanges 278 and 280 and the cranks 320 and 346 cooperate with each other and with the remainder of the mechanism to insure a neutralization of the transmission units 52 and 54 before the mechanism may be operated, that is rotate the lever 362, to make possible a gear shifting operation of the transmission unit 56; and this mechanism makes possible a gear shifting operation of the transmission unit 54 when and only when the parts are operated to first neutralize the transmission units 56 and 52.

There is thus provided, as exemplified in the above described three embodiments of my invention, a simple and compact mechanism for operating a six speeds forward and two speeds reverse transmission mechanism of a motor vehicle, said transmission mechanism including three separate transmission units; and the motor vehicle having said transmission mechanism incorporated therein may be either a tank or an automotive vehicle.

In all three of these embodiments the transmission operating mechanism constituting my invention includes three separate transmission operating force transmitting means, two of which preferably include power means; and these three force transmitting means are actuated by a manually operated selector lever mechanism, including two lever members and interlock mechanism, the parts of which are so constructed and arranged and so operative that one or the other of two of the transmission units of the transmission mechanism is neutralized before the remaining transmission unit of said two units may be operated to establish the same in gear.

Although this invention has been described in connection with certain specific embodiments, the principles involved are susceptible of numerous other applications that will readily occur to persons skilled in the art. The invention is, therefore, to be limited only as indicated by the scope of the appended claims.

I claim:

1. In a motor vehicle having a change-speed transmission mechanism consisting of two change-speed units connected in series and which mechanism may be established in any one of a plurality of gear settings, means for operating said transmission mechanism comprising lever mechanism including two manually controlled levers and means, including a plurality of shafts and a plurality of pressure differential operated motors, interconnecting said lever mechanism and transmission mechanism, the parts of said lever mechanism being so constructed, so arranged and so operative that one of said levers is operative, during a certain operation of said lever mechanism, to effect either one of two relatively low gear ratio settings of the transmission mechanism or either one of two reverse gear settings of the transmission mechanism when and only when the other of said levers is placed in a certain position.

2. In a motor vehicle having a change-speed transmission mechanism consisting of two change-speed units connected in series and which mechanism may be established in any one of a plurality of gear settings, means for operating said transmission mechanism comprising three force transmitting means connected with said transmission mechanism, manually operated lever mechanism and means, including an interlocking member movable within a slotted portion of a part of the transmission operating mechanism, interconnecting said lever mechanism and force transmitting means the parts of said lever mechanism and interconnecting force transmitting means being so constructed and arranged that a part of said lever mechanism may be operated to effect either one of two relatively low forward gear settings of the transmission mechanism or effect either one of two reverse gear settings of said mechanism when and only when another part of said lever mechanism is placed in a certain position.

3. In a motor vehicle having a change-speed transmission mechanism consisting of two change-speed units connected in series and which mechanism may be established in any one of six forward speed settings or two reverse speed settings, means for operating said transmission mechanism comprising manually operated lever mechanism including a lever member having an H-movement and another lever member pivotally mounted thereon and means, including a plurality of shafts and a plurality of pressure differential operated motors, interconnecting said lever mechanism and transmission mechanism the parts of said lever mechanism being so constructed and arranged that a part of said mechanism may be operated to effect either one of two relatively low gear settings of the transmission or either one of two reverse gear settings of the transmission provided another part of said lever mechanism is placed in a certain position.

4. In a motor vehicle having a six speeds forward and two speeds reverse transmission mechanism consisting of two change-speed units connected in series, means for operating said transmission mechanism comprising two interconnecting levers each of which is manually operated and means, including a plurality of shafts, interconnecting said levers and transmission mechanism the parts of said lever mechanism being so constructed and the parts thereof so arranged that a part of said mechanism housed within another part of said mechanism may be operated to effect either one or the other of two relatively low gear ratio settings of the transmission mechanism or either one or the other of two reverse gear settings of the transmission mechanism provided the first mentioned part of the lever mechanism is in a certain position.

5. In a motor vehicle provided with a change-speed transmission mechanism capable of being established in any one of six different forward speed settings or either one of two reverse speed settings said transmission mechanism consisting of two separate change-speed units connected in series, means for operating said transmission mechanism comprising three separate force transmitting means each of said means being connected to a different portion of the transmission mechanism and further comprising a manually operated lever mechanism connected with said force transmitting means said lever mechanism comprising a lever member having an H-movement and another lever member pivotally mounted thereon and operated by means extending through the lever member having the H-movement.

6. In a motor vehicle provided with a change-speed transmission mechanism capable of being established in any one of six forward speed settings or either one of two reverse speed settings said mechanism including three separate nests of gears, means for operating said transmission mechanism comprising three separate force transmitting means each of said means being connected to one of the aforementioned nests of gears and further comprising a manually operated lever mechanism operably connected to said force transmitting means said lever mechanism comprising a lever member having an H-movement and another lever member pivotally mounted thereon and operated by means extending through said lever member having an H-movement.

7. In a motor vehicle provided with a change-speed transmission mechanism capable of being established in any one of six forward speed settings or either one of two reverse speed settings said mechanism including three separate nests of gears, means for operating said transmission mechanism comprising three separate force transmitting means each of said means being connected to one of the aforementioned nests of gears and further comprising a manually operated lever mechanism comprising a lever member having an H-movement and a lever member pivotally mounted thereon and operated by means extending through the lever member having the H-movement said force transmitting means including a shaft constituting a part of the means for operating one of the nests of gears, a tube sleeved over said shaft said tube constituting a part of the means for operating another of the aforementioned nests of gears and another tube sleeved over the aforementioned tube and constituting a part of means for operating the third of the aforementioned nests of gears.

HAROLD W. PRICE.

REFERENCES CITED

The following references are of record in the file of this patent:

UNITED STATES PATENTS

| Number | Name | Date |
|---|---|---|
| 930,419 | Schlig | Aug. 10, 1909 |
| 983,249 | Parker | Jan. 31, 1911 |
| 1,024,562 | Eckert et al. | Apr. 30, 1912 |
| 1,449,269 | Cronk | Mar. 20, 1923 |
| 1,452,220 | Schacht | Apr. 17, 1923 |
| 1,469,579 | Borden | Oct. 2, 1923 |
| 1,533,531 | White | Apr. 14, 1925 |
| 1,916,892 | Peterson | July 4, 1933 |
| 1,993,015 | Moorhouse | Mar. 5, 1935 |
| 2,001,337 | Wiedmaier | May 14, 1935 |
| 2,113,860 | Sanford et al. | Apr. 12, 1938 |
| 2,115,390 | Lasley et al. | Apr. 26, 1938 |
| 2,135,042 | Rossman | Nov. 1, 1938 |
| 2,192,078 | Hautzenroeder | Feb. 27, 1940 |
| 2,316,503 | Curtis | Apr. 13, 1943 |
| 2,355,626 | Bullard et al. | Aug. 15, 1944 |

FOREIGN PATENTS

| Number | Country | Date |
|---|---|---|
| 23,139 | Great Britain | A. D. 1910 |
| 27,422 | Great Britain | A. D. 1902 |
| 335,871 | Great Britain | Oct. 2, 1930 |
| 487,504 | Great Britain | June 22, 1938 |